United States Patent
Kaliamurthy et al.

(10) Patent No.: US 11,023,944 B2
(45) Date of Patent: Jun. 1, 2021

(54) MOBILE DEVICE FOR RETRIEVING PRODUCT INFORMATION ASSOCIATED WITH SCANNED BARCODE DATA WHEN THE MOBILE DEVICE IS CONNECTED TO A NETWORK

(71) Applicant: Target Brands, Inc., Minneapolis, MN (US)

(72) Inventors: Selvaganapathy Kaliamurthy, Karnataka (IN); Divek Karagwal, Karnataka (IN); Shubham Goyal, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 153 days.

(21) Appl. No.: 16/031,430

(22) Filed: Jul. 10, 2018

(65) Prior Publication Data
US 2020/0020012 A1   Jan. 16, 2020

(51) Int. Cl.
*G06Q 30/00*  (2012.01)
*G06Q 30/06*  (2012.01)
*G06K 7/10*  (2006.01)
*G06K 7/14*  (2006.01)

(52) U.S. Cl.
CPC ....... *G06Q 30/0625* (2013.01); *G06K 7/1092* (2013.01); *G06K 7/10881* (2013.01); *G06K 7/1404* (2013.01)

(58) Field of Classification Search
CPC .................. G06Q 30/0623; G06Q 30/0641
USPC ............................................. 705/26.61, 27.1
See application file for complete search history.

(56) References Cited

U.S. PATENT DOCUMENTS

| | | | |
|---|---|---|---|
| 7,287,696 B2 | 10/2007 | Attia et al. | |
| 8,751,316 B1 | 6/2014 | Fletchall et al. | |
| 8,827,147 B2 | 9/2014 | Cameron et al. | |
| 2006/0230184 A1* | 10/2006 | Velline | H04L 69/08 709/246 |
| 2008/0113814 A1* | 5/2008 | Osburn | G07F 17/32 463/42 |
| 2010/0077323 A1 | 3/2010 | Hunter | |
| 2010/0151901 A1 | 6/2010 | Roden et al. | |
| 2013/0134213 A1 | 5/2013 | Pallakoff et al. | |
| 2013/0193201 A1 | 8/2013 | Bradley et al. | |
| 2014/0340423 A1* | 11/2014 | Taylor | G06K 9/6202 345/633 |
| 2016/0300217 A1 | 10/2016 | Grabovski et al. | |

(Continued)

OTHER PUBLICATIONS

Scandit to Discuss Mobile Vision and Augmented Reality at Future Stores Retail Conference, Jun. 19, 2018, SyndiGate Media, Inc. (Year: 2018).*

(Continued)

*Primary Examiner* — Brittney N Miller
(74) *Attorney, Agent, or Firm* — Theodore M. Magee; Westman, Champlin & Koehler, P.A.

(57) ABSTRACT

A computer-implemented method includes receiving a request to scan a barcode and in response, displaying a split screen having a camera image portion and a product information portion. At least part of an image currently being captured by a camera and containing a barcode is displayed in the camera image portion. Product information for a product represented by the barcode is displayed in the product information portion.

7 Claims, 9 Drawing Sheets

(56) References Cited

U.S. PATENT DOCUMENTS

2016/0371633 A1* 12/2016 Stout ................. G06K 17/0022
2017/0116786 A1* 4/2017 Ramkumar ......... G06F 3/04842

OTHER PUBLICATIONS

Webpage, https://itunes.apple.com/us/app/scan-qr-code-barcode-reader/id411206394?mt=8, Scan-QR Code, Barcode Reader on the App Store, 3 pages, accessed Mar. 26, 2018.
Webpage, https://play.google.com/store/apps/details?id=com.ScanLife, ScanLife Barcode & QR Reader—Apps on Google Play, 3 pages, accessed Mar. 26, 2018.
Webpage, https://www.dynamsoft.com/Products/online-camera-barcode-scanner.aspx, Implement a Camera Barcode Scanner Using Dynamsoft Imaging SDKs, 5 pages, accessed Feb. 19, 2018.

* cited by examiner

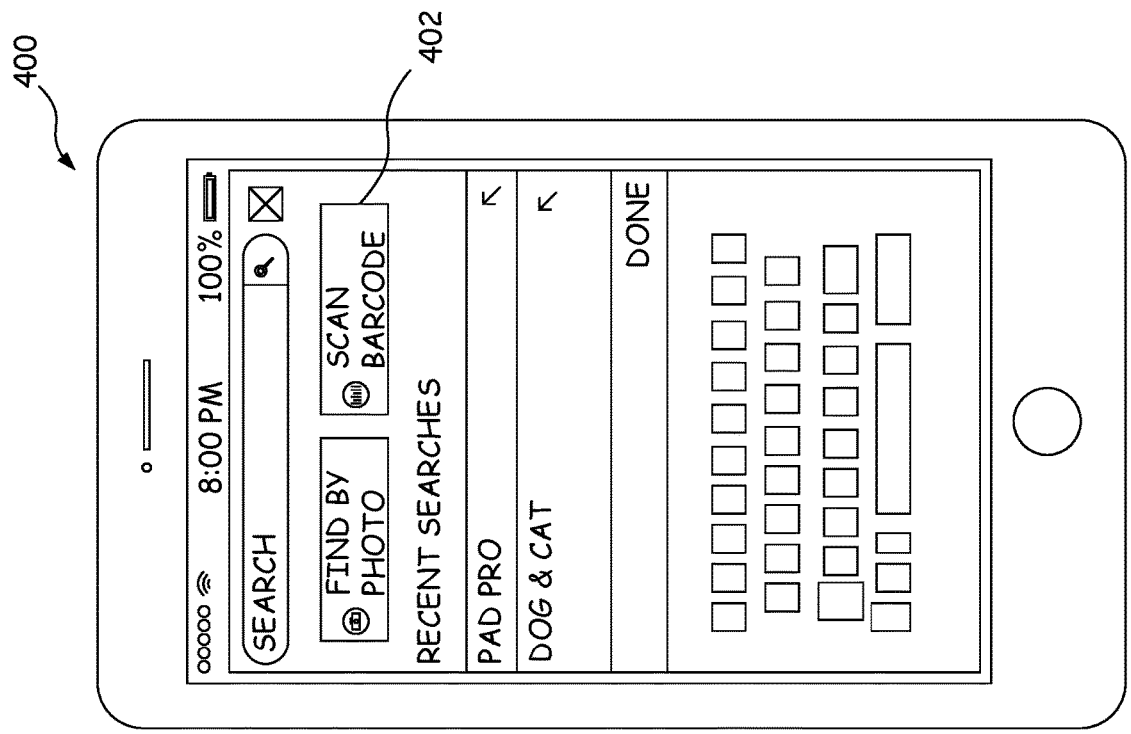
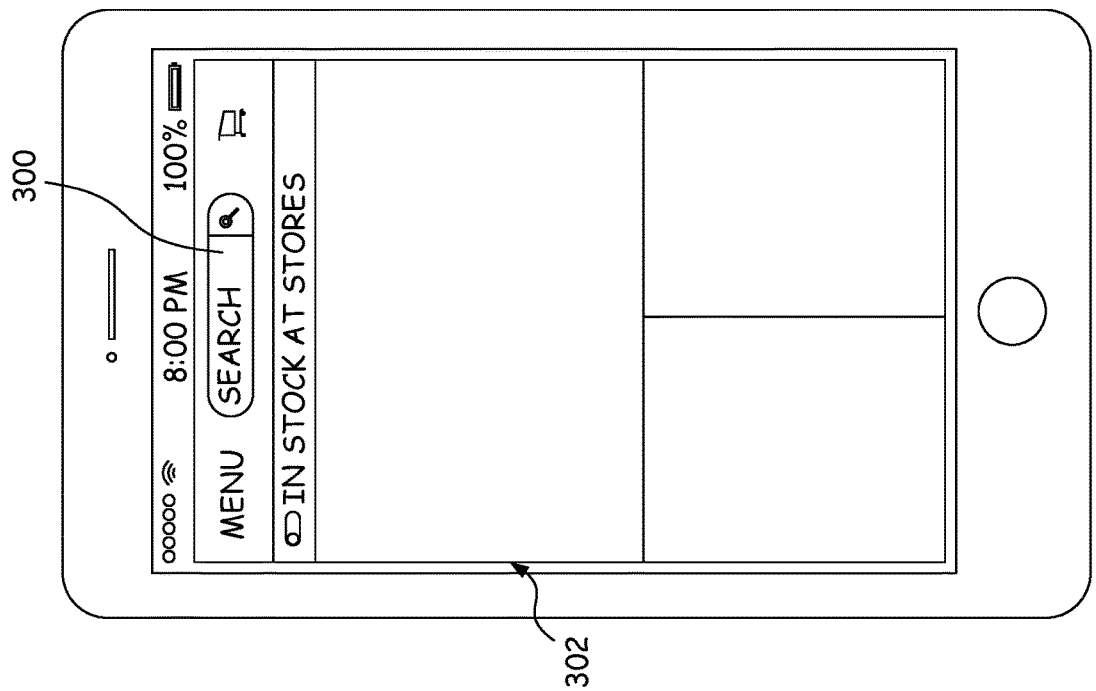
FIG. 4
FIG. 3

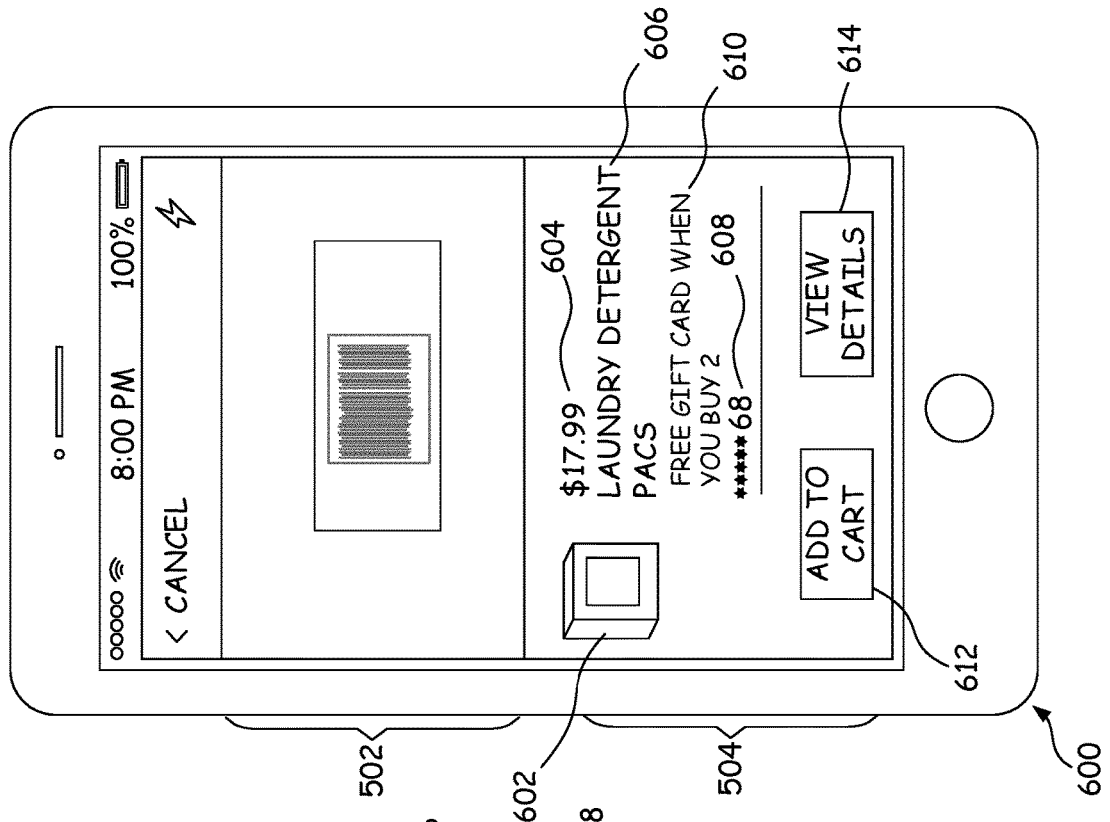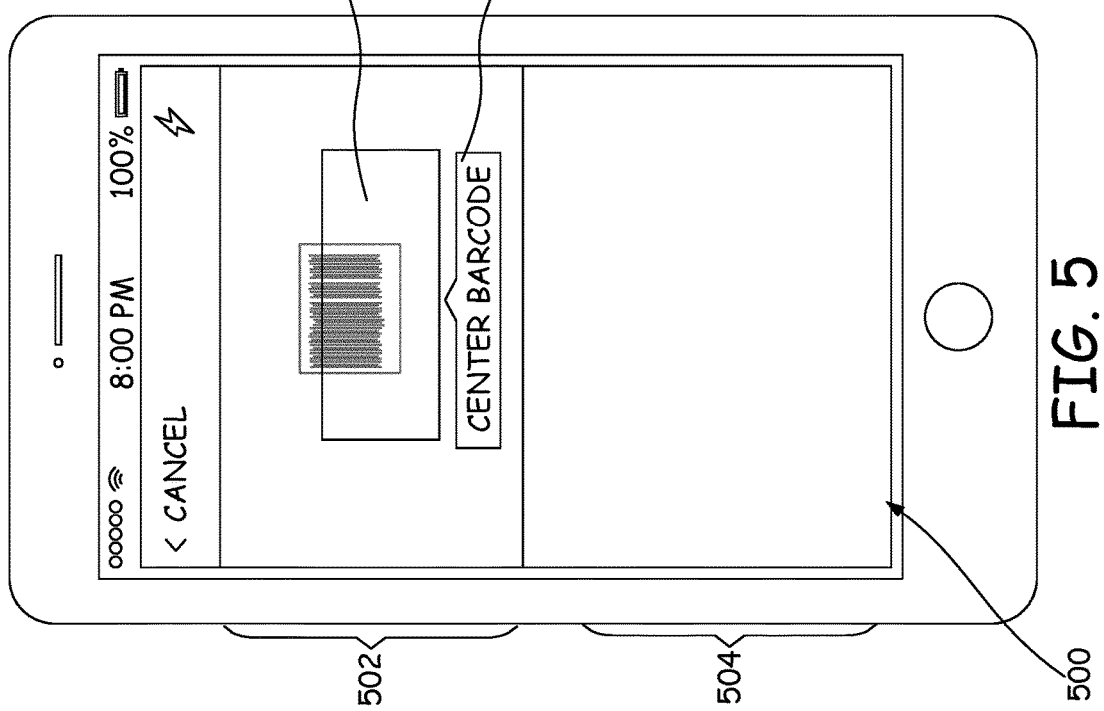

MOBILE DEVICE FOR RETRIEVING
PRODUCT INFORMATION ASSOCIATED
WITH SCANNED BARCODE DATA WHEN
THE MOBILE DEVICE IS CONNECTED TO
A NETWORK

BACKGROUND

Mobile devices such as Smart Phones have become sophisticated computing devices that include processors capable of executing one or more applications, touch screens providing interactive user interfaces and cameras capable of capturing still images and video. Nearly all mobile devices include a web browser application that allows users to download and view pages from websites on the Internet as well as various types of media including documents and videos. Many web browser applications support script execution within the web browser, such as the execution of Java Script.

Mobile devices are typically shipped with a small collection of applications that can be executed on the mobile device. Additionally, users are able to download applications on the mobile device through a network connection to an application marketplace. However, downloading additional applications requires the user to take several steps that act as a barrier to acquiring the functionality provided by the applications. In particular, the user must discover that the application exists either through word of mouth or by performing searches in the application marketplace. Additionally, the user must select the application from the marketplace and wait for the application to download to the mobile device. Given the large number of applications in the marketplace, most users do not download a significant percentage of the available applications. As a result, adoption of mobile device applications is typically quite low.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a request to scan a barcode and in response, displaying a split screen having a camera image portion and a product information portion. At least part of an image currently being captured by a camera and containing a barcode is displayed in the camera image portion. Product information for a product represented by the barcode is displayed in the product information portion.

In accordance with a further embodiment, a mobile device includes a camera, a display, a memory containing instructions, and a processor executing the instructions in the memory to perform steps. The steps include receiving a request to scan for barcodes and displaying a user interface with an image area containing images produced by the camera, and a product area containing product information for a product associated with a barcode shown in the image area wherein the product information changes automatically when the barcode shown in the image area changes.

In accordance with a still further embodiment, a method includes executing a web application within a browser application on a device such that the web application performs a test to determine if the browser application can request images from a camera on the device. When the browser application can request images from the camera, the web application displays a control to request barcode scanning and receives an indication that the control has been used to request barcode scanning. In response, the web application shows a split screen user interface depicting images captured by the camera in one portion of the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 provides an example user interface on a mobile device provided by a web browser application in accordance with one embodiment.

FIG. 4 provides an example user interface provided by a web browser application showing a scan barcode control in accordance with one embodiment.

FIG. 5 provides an example user interface provided by a web browser application showing a split screen in accordance with one embodiment.

FIG. 6 provides an example user interface provided by a web browser application showing product information added to the split screen for a barcode in accordance with one embodiment.

DETAILED DESCRIPTION

The cameras on mobile devices can be used to capture images of barcodes on products. Numbers and/or letters represented by the barcode can then be decoded from the barcode and can be submitted as an identifier for the product. Such identifiers can be submitted as a request to purchase the product online and/or to receive additional information about the product online. In the past, as soon as the barcode was decoded, the user interface was changed to either take the user to a purchase page or to take the user to a page displaying information about the product. If the user wished to scan another barcode for a different product, they had to interact with several controls in order to move away from the page they have been directed to and bring back a user interface that could be used to capture the barcode. These interactions made the mobile device inefficient when attempting to receive information for a large number of products based on their barcode.

In the various embodiments described below, a user interface is provided in which a split screen is shown with one portion of the screen containing images provided by a camera in the mobile device containing a barcode of a product and a second portion of the split screen containing information for the product associated with the barcode. When the user shifts the mobile device so that the camera captures an image of a different barcode, the displayed product information automatically changes so that it corresponds to the new barcode without the user having to select any controls on the mobile device. As a result, the user is able to quickly receive product information for a number of different products simply by scanning over the barcodes of the different products. Further, since the product information changes as soon as the barcode is capable of being read, the user is able to receive feedback that the barcode has been properly positioned within the camera portion of the split screen based on the change in product information in the product information portion of the split screen.

"Barcode" as used herein includes one-dimensional or linear codes that use black and white vertical lines to encode information as well as multi-dimensional codes (two or more) including QR codes, that encode information using two-dimensional shapes and/or multiple different colors. In some embodiments, the barcode is embedded within another graphic. In some embodiments, the barcode can be perceived by human eyes and in other embodiments, the barcode can only be perceived by a camera or scanner that includes a digital filter.

Figure 1:
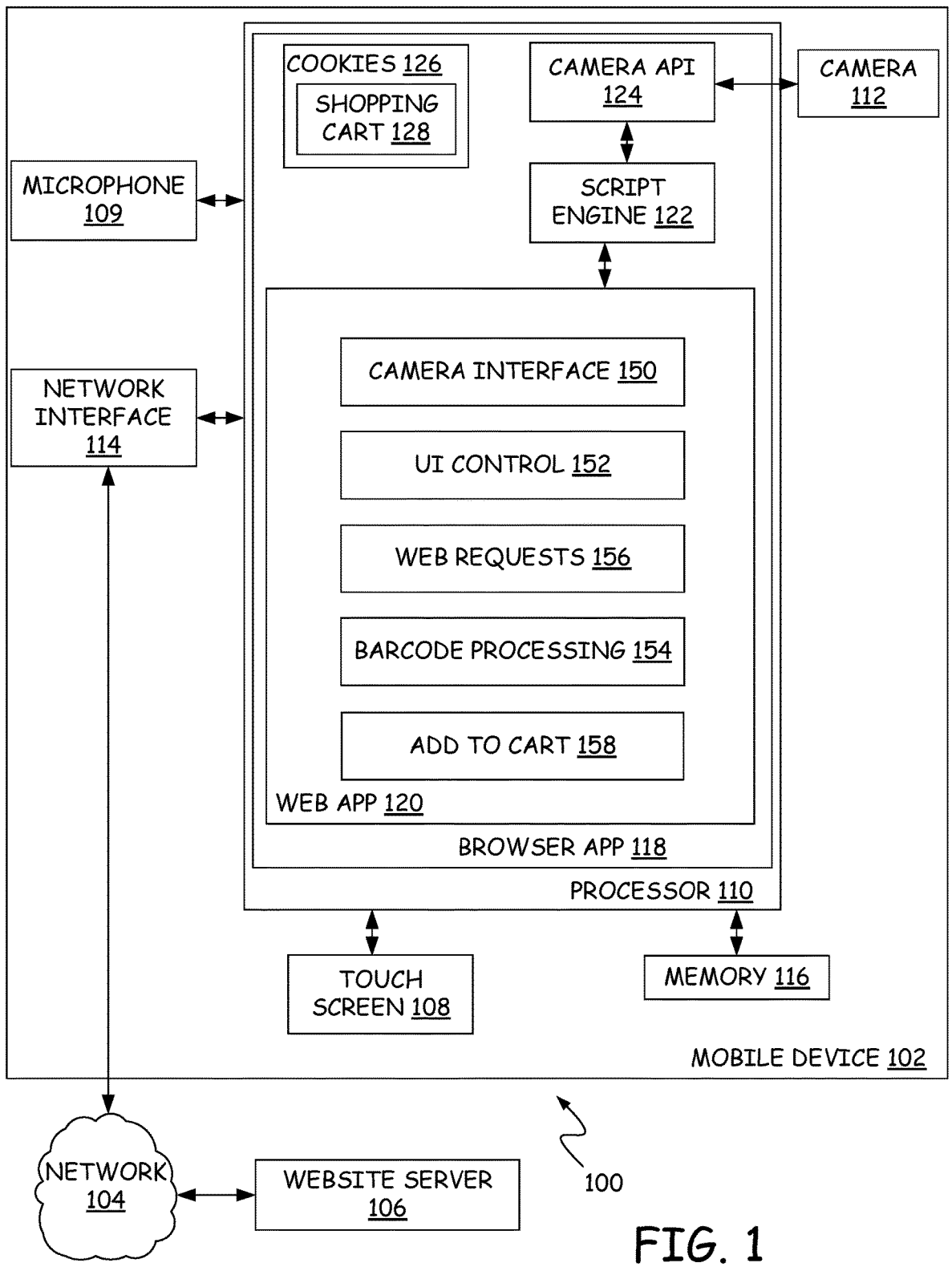
FIG. 1 provides a block diagram of a system used in accordance with one embodiment.

FIG. 1 provides a block diagram of a system 100 including a mobile device 102 that communicates with a website server 106 through a network 104. Mobile device 102 includes a touchscreen 108, a processor 110, a camera 112, a microphone 109, a network interface 114, and a memory 116. Processor 110 includes a central processing unit and a local memory cache and is connected to touchscreen 108, camera 112, microphone 109, network interface 114 and memory 116 through one or more buses and/or interfaces. Processor 110 is capable of executing one or more applications, referred to as apps, which can be stored in the local cache or in a combination of the local cache and portions of memory 116 during execution. For example, processor 110 is shown to be executing browser app 118 in FIG. 1. Browser app 118 is able to issue requests to website server 106 through network interface 114 and network 104. These requests can include requests to post data to website server 106 and to request webpages and/or media from website server 106. The requested webpages can have embedded therein various types of media, such as documents or videos and can further include embedded scripts that can be executed by a script engine 122 within browser app 118. For example, in FIG. 1, a script representing a web app 120 is shown to have been downloaded from website server 106 by browser app 118 so that it can be executed by script engine 122. Browser app 118 also includes a camera API 124 that is able to communicate with camera 112 of mobile device 102 to activate camera 112 so that it captures a stream of images and sends the captured images to camera API 124 for use in the script executed by script engine 122. Browser app 118 also includes the ability to store state information for web sessions in the form of cookies 126. In FIG. 1, cookies 126 include a shopping cart 128 that indicates the content of an online shopping cart that includes items that the user has indicated they wish to purchase but that have yet to purchase. In other embodiments, shopping cart 128 is maintained on website server 106.

Figure 2:
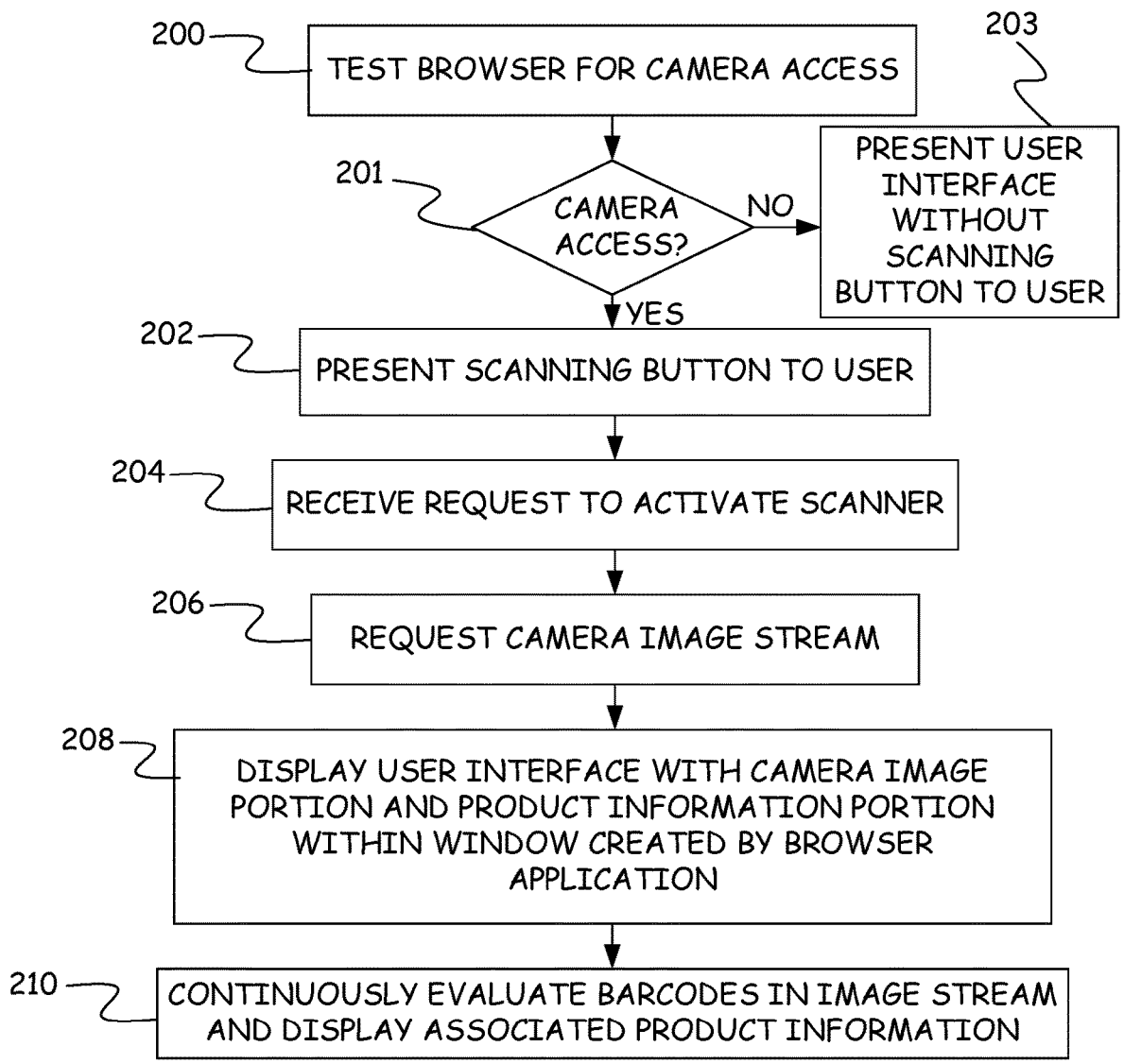
FIG. 2 provides a flow diagram of a method for displaying product information using barcodes in a retail environment.
Figure 7:
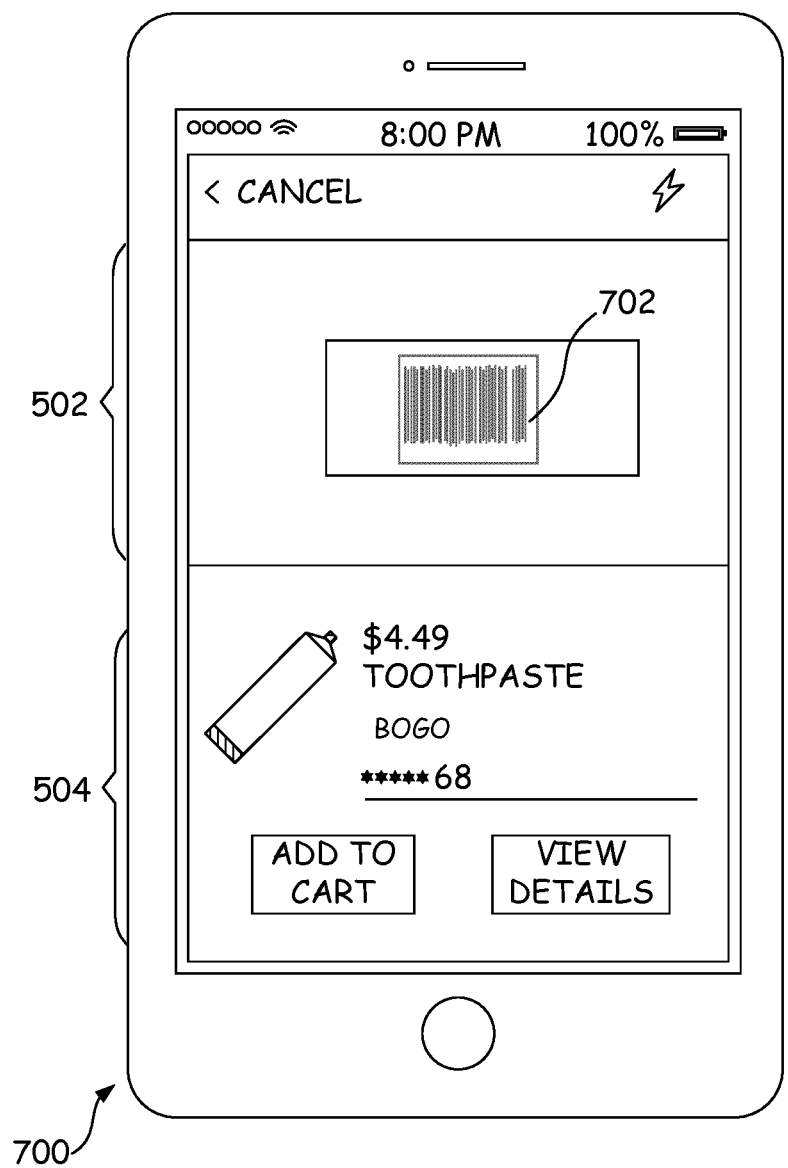
FIG. 7 shows a change in the product information for a change in the barcode shown in the user interface provided by the web browser application in accordance with one embodiment.

FIG. 2 provides a flow diagram of a method of using a mobile device to scan barcodes and using the scanned barcodes to display product information on the mobile device in accordance with one embodiment. In step 200 of FIG. 1, a camera interface 150 in web app 120 tests browser app 118 to determine if browser app 118 implements camera API 124 to allow for access to camera 112. If browser app 118 does not implement a camera API at step 201, web app 120 displays a user interface that does not include a scanning button at step 203. However, if camera API 124 is supported by browser app 118, web app 120 presents a scanning button to the user at step 202 through user interface control 152. In accordance with one embodiment, the scanning button is presented to the user on a search screen of web app 120. FIG. 3 shows an example user interface 302 generated by web app 120 through browser app 118 that can be used to request the search screen by selecting search field 300. Upon selection of search field 300, user interface 400 of FIG. 4 is created by web app 120, which includes a scan barcode control 402.

At step 204 of FIG. 2, a request to activate the scanner is received when a user selects scan barcode control 402. In response, at step 206, camera interface 150 of web app 120 requests a camera image stream through camera API 124 of browser app 118. In particular, camera API 124 accesses camera 112 to obtain a continuous stream of images captured by camera 112 and provides that stream of images to camera interface 150 as executed by script engine 122.

Camera interface 150 provides the stream of camera images to a UI control 152, which displays a split screen user interface with a camera image portion and a product information portion at step 208. In accordance with one embodiment, the split screen user interface is created within a window created by browser app 110. FIG. 5 provides an example of the split screen user interface 500 showing the camera image portion 502 and the product information portion 504. Initially, the product information portion is blank since the barcode has yet to be decoded as shown in FIG. 5. In accordance with some embodiments, the camera portion includes a barcode target area 506 that provides a clearer view of the camera image than other parts of camera portion 502, which filter the pixels of the camera image. In addition, an instruction 508 directs the user to center the barcode within the barcode target area 506. At step 210, UI control 152 and barcode processing 154 of web app 120 continuously evaluate barcodes in the image stream from camera 112 to decode information from the barcode and to retrieve and display product information associated with the decoded information. User interface 600 of FIG. 6 shows the display of such product information in product portion 504. The product information includes a product image 602, product price 604, product description 606, a rating 608, an offer 610, as well as an ADD TO CART control 612 and a VIEW DETAILS control 614 described further below.

The continuous evaluation of barcodes in step 210 means that as camera 112 is shifted and a new barcode comes into view, barcode processing 154 and UI control 152 automatically update the product information displayed in product information portion 504 without requiring the user to interact with any further controls. For example, user interface 700 shows a change in the product information of product information portion 504 due to a different barcode 702 being captured by camera 112 as shown in camera portion 502. Thus, the user is able to receive information for a large number of different products simply by moving the camera to different barcodes. In addition, the changes in the product information of product information portion 504 provide feedback to the user that the barcode has been read by the mobile device.

Figure 8:
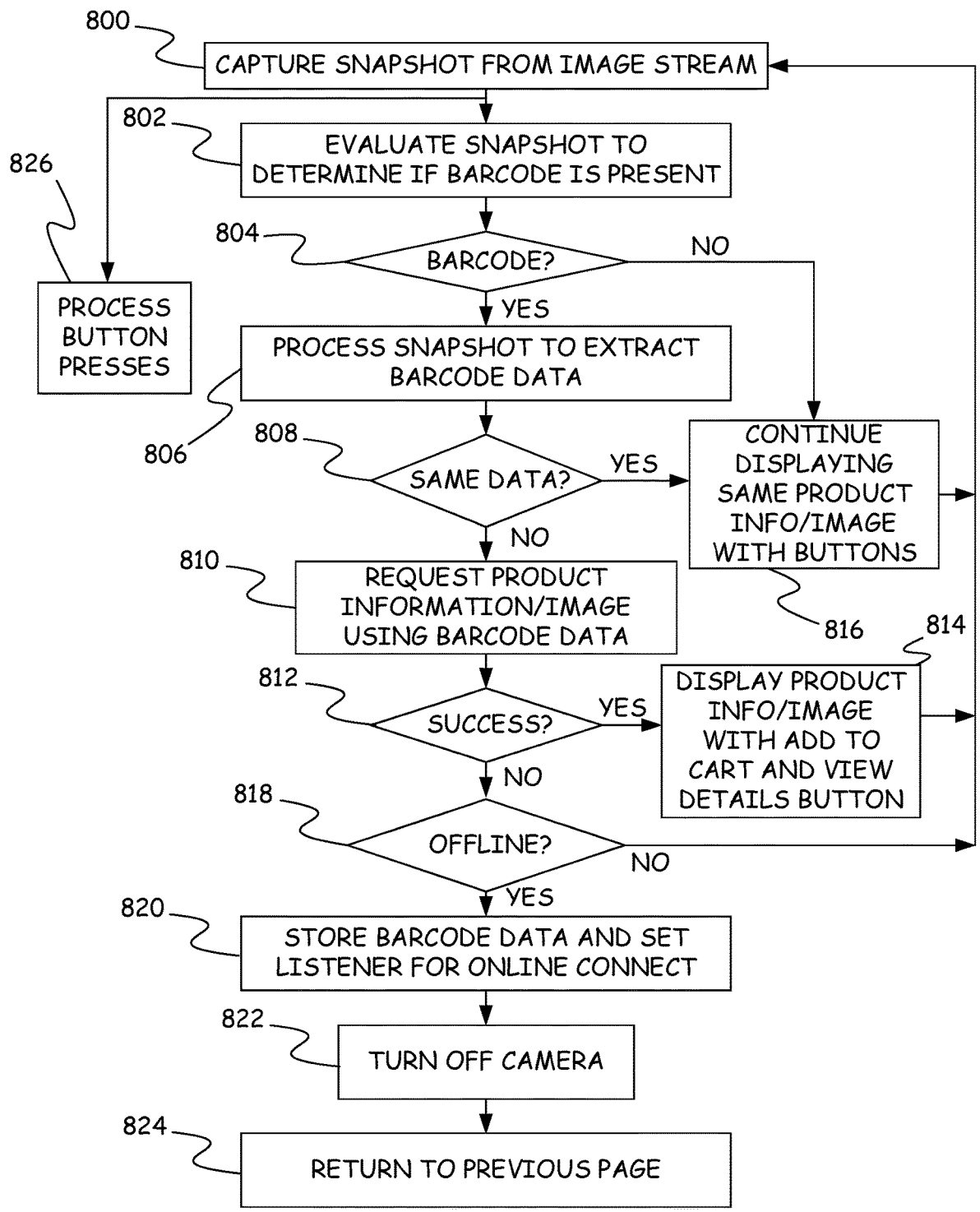
FIG. 8 provides a flow diagram of a method for displaying product information based on a barcode captured by a camera in accordance with one embodiment.

FIG. 8 provides a flow diagram of a method of performing the continuous evaluation of barcodes in step 210. In step 800 of FIG. 8, barcode processing 154 captures one of the images in the image stream. In accordance with one embodiment, step 800 is performed once every 100 ms. At step 802, barcode processing 154 evaluates the snapshot image to determine if a barcode is present in the image. In accordance with one embodiment, step 802 involves comparing neighboring pixels to identify edge pixels where the image transitions from black to white. The number of such edges is then computed and compared to a threshold. At step 804, if there enough edge transitions in the image to indicate that a barcode is present, barcode processing 154 processes the image at step 806 to extract the information represented by the barcode such as a sequence of numbers and/or letters. The information represented by the barcode is referred to as barcode data. At step 808, barcode processing 154 compares the currently extracted barcode data to the previously extracted barcode data to determine if it is the same. If the barcode data is different from the previously extracted barcode data, web app 120 uses web request 156 to request product information/images from website server 106 for the product associated with the barcode data at step 810.

If web request 156 successfully retrieves the product information at step 812, the product information is displayed in the product portion of the split screen user interface at step 814 together with an ADD TO CART button and a VIEW DETAILS button. The process of FIG. 8 then returns to step 800 to capture a new image from the image stream. When an image does not contain a barcode at step 804 or when the barcode data is the same as the previously extracted barcode data at step 808, UI control 152 continues to display the product information/image, ADD TO CART button and VIEW DETAILS button that was previously displayed at step 816. Thus, in accordance with such embodiments, the product information for the last decoded barcode continues to be displayed until a new barcode is read at step 808 at which point new product information is requested at step 810 and is displayed in place of the old product information at step 814.

Because web app 120 is executing within browser app 118 and because web app 120 requires product information to be sent by website server 106, the product information cannot be displayed if mobile device 102 does not have a network connection and is therefore considered to be "offline". If web request 156 fails to receive the product information at step 812, web request 156 determines if mobile device 102 is offline at step 818. If mobile device 102 is not offline at step 818, the process returns to step 800 to capture a new snapshot from the image stream. If mobile device 102 is offline at step 818, the barcode data is stored and a listener task is set that will listen for connect event at step 820. Such a listener will be triggered the next time the mobile device connects to the network as discussed further below. At step 822, after the listener has been set, camera interface 150 instructs camera 112 to turn off through camera API 124. UI control 152 then displays the page that was shown before the barcode scan button was selected at step 824.

Figure 9:
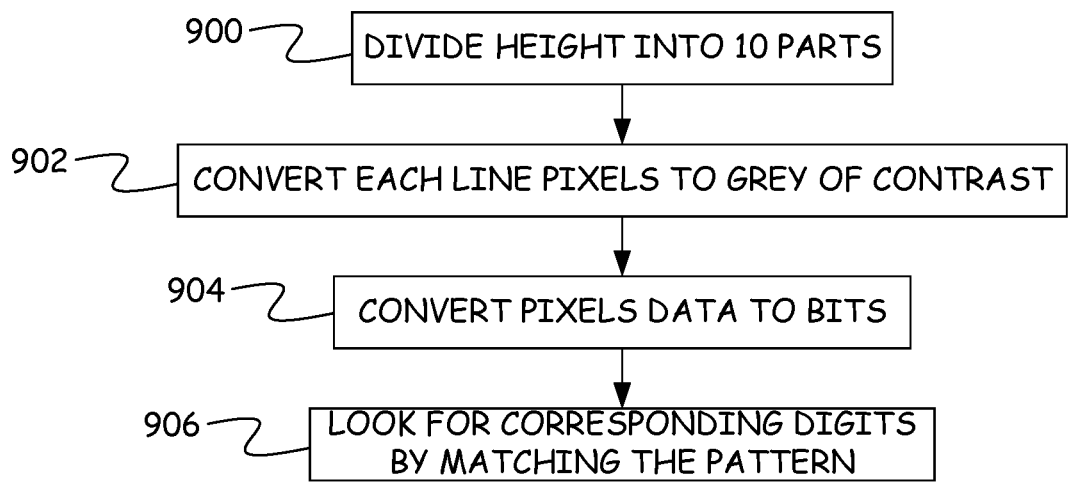
FIG. 9 provides a flow diagram of a method for processing a barcode in accordance with one embodiment.

FIG. 9 provides a flow diagram of a method of processing a snapshot to extract barcode data in accordance with one embodiment. At step 900, the image is divided vertically into 10 parts. At step 902, the pixels along the boundaries between each of the 10 parts are converted to grey scale for contrast. At step 906, the pixels along each line are compared to the pixel values along the other lines to determine a variance for the start, middle and end of each line. If each of these variances is small, indicating that the same pixel values are present at each height of the image, the pixel values are converted into either a one or zero at step 904.

At step 906, the bit values determine in step 904 for the barcode are compared to patterns defined for the particular barcode protocol being used. The characters or symbols associated with the matching digital patterns are then retrieved at step 906.

Returning to FIG. 8, while the split screen user interface is being displayed showing a camera portion and a product portion with an ADD TO CART control and a VIEW DETAILS control, the user can select either the ADD TO CART control or the VIEW DETAILS control. When one of the controls is selected, the selected button is processed at step 826.

Figure 10:
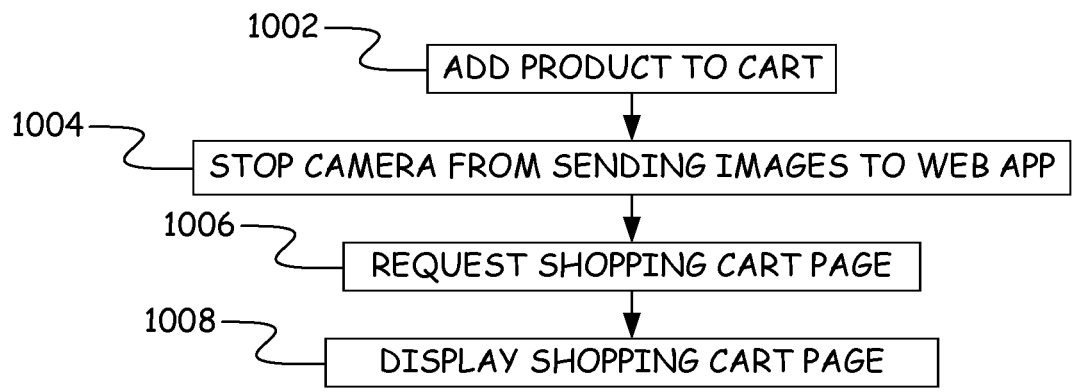
FIG. 10 provides a flow diagram of a method of processing selection of an add-to-cart control displayed with product information in a split screen in accordance with one embodiment.

FIG. 10 provides a flow diagram of a method of processing a selection of an ADD TO CART control such as ADD TO CART 612. At step 1002, an add to cart process 158 adds the product to the electronic shopping cart by either storing the identity of the product in shopping cart 128 of cookies 126 or sending a request to website server 106 through network interface 114 and network 104 to have the product added to the shopping cart stored on website server 106 for the user of mobile device 102. At step 1004, camera interface 150 uses camera API 124 to instruct camera 112 to cease sending images to web app 120. At step 1006, web request 156 requests the shopping cart page from website server 106 and at step 1008, browser app 118 displays the shopping cart page.

Figure 11:
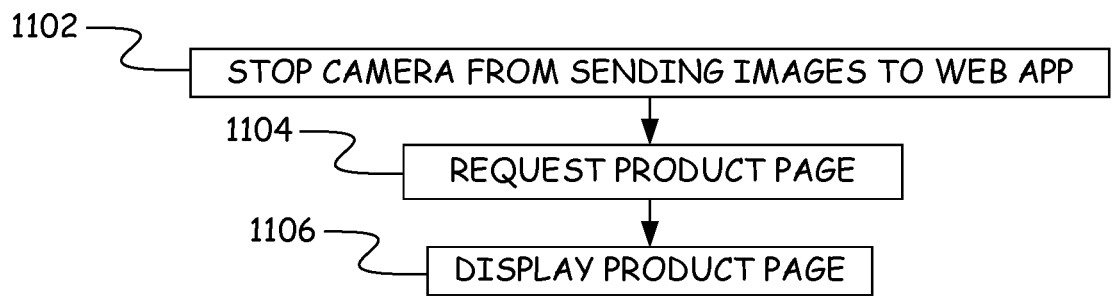
FIG. 11 provides a flow diagram of a method of processing selection of a view-details control displayed with product information in a split screen in accordance with one embodiment.

FIG. 11 provides a flow diagram of a method for processing the selection of a VIEW DETAILS control such as VIEW DETAILS control 614 in step 826. In step 1102 of FIG. 11, camera interface 150 uses camera API 124 to instruct camera 112 to stop sending images to web app 120. At step 1104, web request 156 requests the product page of the product shown in product portion 504 from website server 106. At step 1106, browser app 118 displays the product page returned by website server 106.

Figure 12:
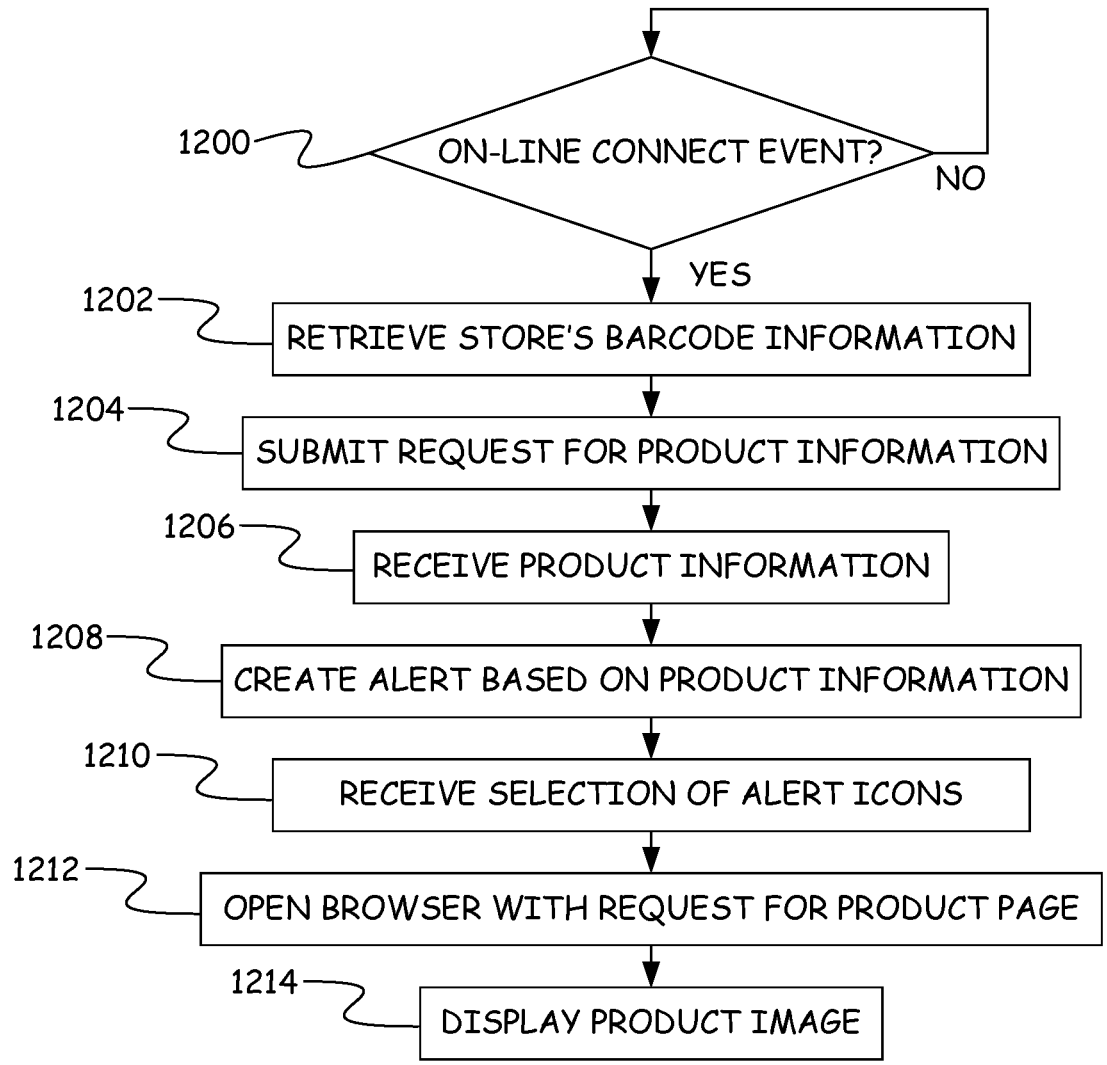
FIG. 12 is a flow diagram of a method performed when a mobile device reconnects to a network in accordance with one embodiment.

FIG. 12 provides a flow diagram of a method implemented by a listener set in step 820 of FIG. 8 when mobile device 102 was offline. In step 1200 of FIG. 12, the listener waits for an online connect event. When mobile device 102 reconnects to the network at step 1200, processor 110 generates an online connect event that causes the listener to retrieve the stored barcode information at step 1202. The listener then requests product information from website server 106 for the barcode data at step 1204. At step 1206, the product information is received and at step 1208, the listener creates an alert based on the received product information, which includes the product information as well as a product image. An icon for the alert is added to the status bar of the mobile device when the alert is created and when the user selects the icon for the alert at step 1210, browser app 118 is started and a request for the product page of the product is made to website server 106 at step 1212. At step 1214, the product page is returned and displayed within browser app 118.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A mobile device comprising:
a camera;
a display;
a processor executing the instructions in the memory to perform steps comprising:
    receiving a request to scan for barcodes;
    displaying a user interface with an image area containing images produced by the camera and a product area configured to contain product information for a product associated with a barcode shown in the image area;
    determining that the mobile device is not connected to a network;
    storing data determined from a barcode displayed in the image area;
    determining that the mobile device has connected to the network and, in response, using the stored data to retrieve product information for a product associated with the stored data through the network; and
    setting an alert on the mobile device to indicate that the product information has been received.

2. The mobile device of claim 1, wherein displaying the product area comprises displaying a control to add the product to an electronic shopping cart.

3. The mobile device of claim 2, wherein displaying the product area comprises displaying a control to view details of the product.

4. The mobile device of claim 1, wherein displaying the user interface comprises displaying the user interface within a window of a web browser application.

5. The mobile device of claim 4, further comprising, in response to receiving the request to scan for barcodes, sending a request for images from the camera through the web browser application.

6. The mobile device of claim 5, further comprising testing whether the web browser application can request images from the camera and, in response to the web browser application being able to request images from the camera, displaying a control for requesting a scan for barcodes.

7. The mobile device of claim 1, wherein the product area comprises an image of the product.

* * * * *